April 12, 1966   O. A. KERSHNER   3,245,499
SPREADING TYPE DISC BRAKE
Filed Oct. 7, 1963   2 Sheets-Sheet 1
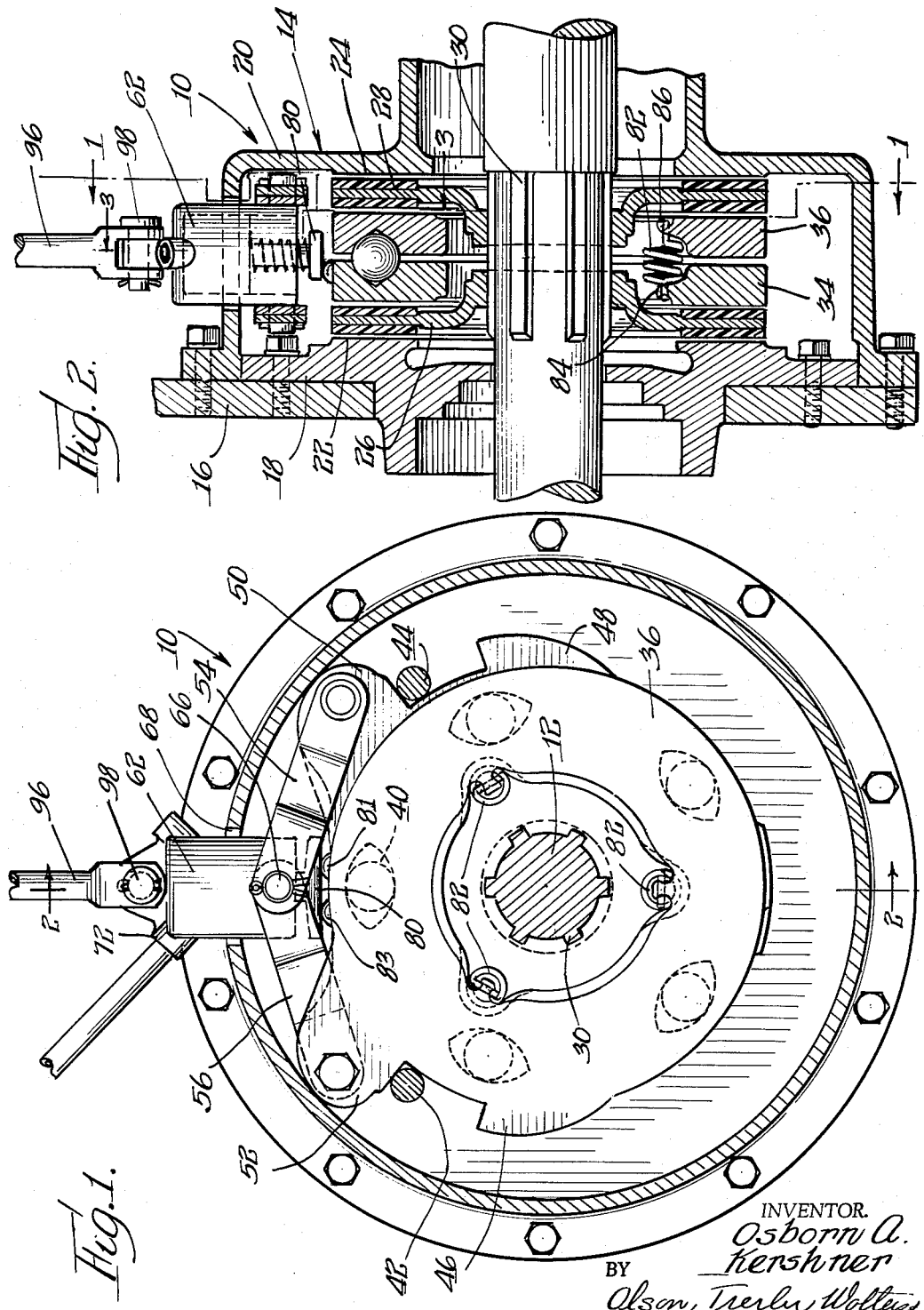
INVENTOR.
Osborn A. Kershner
BY
Olson, Trexler, Wolters & Bushnell
attys.

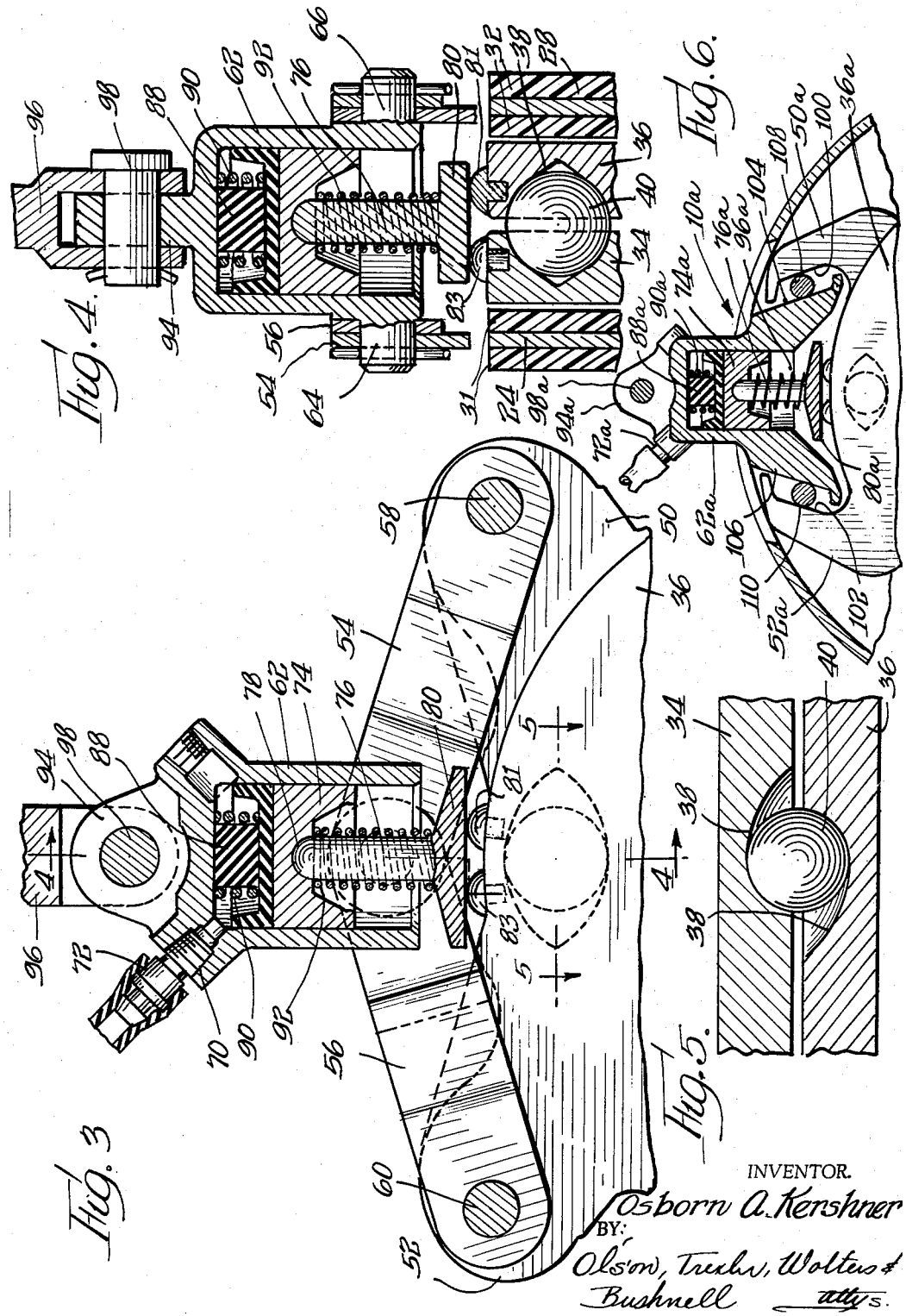

United States Patent Office 3,245,499
Patented Apr. 12, 1966

3,245,499
SPREADING TYPE DISC BRAKE
Osborn A. Kershner, St. Joseph, Mich., assignor, by mesne assignments, to Lambert Brake Corporation, St. Joseph, Mich., a corporation of Michigan
Filed Oct. 7, 1963, Ser. No. 314,228
11 Claims. (Cl. 188—72)

The present application relates to a novel brake structure and more specifically to a novel disc type friction device or brake structure.

Heretofore suggested brake structures of the general type contemplated herein have included a pair of actuating discs which are adapted to spread apart upon being relatively rotated for energizing the brake structure. Various means have been suggested for relatively rotating the actuating discs and while certain of such means have been generally successful, difficulties have been encountered in obtaining fluid pressure or hydraullicay operated structures which are sufficiently economical, efficient and compact to permit widespread use.

An important object of the present invention is to provide a novel disc type brake structure having fluid pressure operated actuating means constructed and arranged for obtaining a relatievly simple, efficient and economical construction.

A further important object of the present invention is to provide a novel disc type brake structure having fluid pressure operable actuating means constructed and arranged for obtaining a compact construction and for facilitating installtaion of the brake structure in a wide variety of machines including existing and new machines.

Other objects and advantages of the present invention will become apparent from the following description and the accompanying drawings wherein;

FIG. 1 is a partial sectional view taken generally along line 1—1 in FIG. 2 and showing a brake structure incorporating features of the present invention;

FIG. 2 is a partial sectional view taken along line 2—2 in FIG. 1;

FIG. 3 is an enlarged fragmentary partial sectional view taken along line 3—3 in FIG. 2;

FIG. 4 is a fragmentary sectional view taken along line 4—4 in FIG. 3;

FIG. 5 is an enlarged fragmentary sectional veiw taken along line 5—5 in FIG. 3; and FIG. 6 is a fragmentary sectional view similar to FIG. 3 but showing a modified form of the present invention.

Referring now more specifically to the drawings wherein like parts are designated by the same numerals throughout the various figures, a brake structure 10 incorporating features of the present invention is shown in FIGS. 1–5. As will be understood, the brake structure is adapted to be installed in tractors and various other machines having a rotatable shaft 12 which is to be controlled.

The brake structure 10 comprises housing means 14 mounted on a fixed frame member 16 of the machine or tractor in concentric relationship with respect to the rotatable shaft 12. The housing means includes opposite end members 18 and 20 presenting axially spaced annular friction surfaces 22 and 24.

Annular friction discs 26 and 28 are disposed within the housing between and respectively adjacent the opposed friction surfaces 22 and 24. The friction discs 26 and 28 are disposed on the shaft 12 and are connected by splines 30 or other suitable means for rotation with the shaft and also so as to be axially shiftable with respect to the shaft. In the embodiment shown, each of the friction discs 26 and 28 comprises a central metal disc member and annular bands 31 and 32 of a suitable friction material fixed against opposite sides of the central metal disc.

Opposed actuating discs 34 and 36 are disposed between the friction discs 26 and 28. The actuating discs are identical to each other but oppositely disposed and each includes a plurality of circumferentially spaced ball seats or cam surfaces 38 in a side thereof. The actuating discs are disposed so that the ball seats are arranged in generally opposed relationship and cam or ball elements 40 are positioned within opposing pairs of ball seats. The ball seats 38 are elongated circumferentially of the actuating discs and are inclined so that upon relative rotation of the actuating discs, the ball elements ride up on the seats 38 and force the actuating discs axially away from each other. This action causes the actuating discs to engage the friction discs and force the friction discs against the friction surfaces 22 and 24 of the housing means for accomplishing a braking operation.

In order to limit rotation of the actuating discs, torque accommodating abutment elements or pins 42 and 44 are fixed between the end members 18 and 20 of the housing means respectively for engagement with an ear 50 integral with the disc 34 and an ear 52 integral with the disc 36. It will be observed that the ears 50 and 52 face circumferentially in opposite directions so that the pin 42 limits rotation of the disc 36 in a counter clockwise direction as viewed in FIG. 1 while the pin 44 limits rotation of the disc 34 in a clockwise direction. Thus the brake structure is effective for providing a retarding action regardless of the directional rotation of the shaft 12. Lugs 46 and 48 integral with actuating discs 34 and 36 respectively limit the maximum rotation by contacting pins 42 and 44 when friction members 31 and 32 are in a completely worn condition.

As previously indicated, the brake structure is adapted to be energized by relatively rotating the actuating discs 34 and 36 for causing the ball elements 40 to ride up on the cam surface for spreading the discs. In accordance with an important feature of the present invention the brake structure is provided with relatively simple, compact and efficient fluid pressure operable means for relatively rotating the actuating disc and thereby energizing the brake. In this embodiment this means comprises ears 50 and 52 respectively integral with and projecting generally laterally or radially from peripheral edges of the discs 34 and 36 at locations spaced circumferentially of the discs from each other. Links 54 and 56 are respectively connected to the ears 50 and 52 by pins 58 and 60. These links are formed with bifurcated end portions which embrace a fluid pressure cylinder 62. The cylinder is provided with stub shafts or pins 64 and 66 extending along a common axis from opposite sides thereof and pivotally connecting the bifurcated ends of the links 54 and 56 with the cylinder such that the axis of the pivot pins 64 and 66 is midway between the axes of the pivot pins 58 and 60.

The cylinder 62 is of a small compact configuration and extends loosely through an opening 68 in the periphery of the housing means as shown in FIGS 1 and 2. An outer end of the cylinder is formed with an inlet opening 70 accommodating a suitable hose or pipe fitting 72 which is adapted to be connected by a conduit with a source of fluid under pressure. Such fluid under pressure may provide air or liquid as desired.

A piston 74 is slidably disposed within the cylinder 62. A piston or push rod 76 is disposed between the piston 74 and the actuating discs and has a rounded upper end 78 abutting against a complementary seat in the piston. A lower end of the piston rod is provided with an enlarged base portion 80 adapted to overlie peripheral portions of both the actuating discs as shown best in FIGS. 3 and 4. Preferably rounded and hardened wear buttons 81 and 83 are fixed on the discs 34 and 36 respectively for engaging the portion 80 and minimizing frictional contact.

With the construction arrangement of the piston and cylinder means described above, the brake structure is adapted to be energized by introducing fluid under pressure into the upper end of the cylinder through the opening 70. This causes the piston 74 and the rod 76 to be urged downwardly toward the peripheral edges of the actuating discs. Such downward movement is prevented by the abutment provided by the actuating discs and as a result the cylinder 62 is shifted radially outwardly with respect to the actuating discs for pulling the links 54 and 56 and thereby causing the pivot pins 58 and 60 to move toward each other. This action causes relative rotation of the actuating discs and energization of the brake. During this action the actuating discs rotate and are axially shifted relative to the base portion 80 of the piston rod and it will be noted that the base portion is formed with a sufficient width to accommodate the axial movement. Furthermore, the rounded or ball joint connection between the piston rod and the piston permits the piston rod to pivot relative to the piston in response to rotative and axial relative movement of the actuating discs. Engagement between the base portion 80 and the peripheral edges of the actuating discs is such as to facilitate relative sliding movement between the base portion of the piston rod and the actuating discs.

In order to deenergize the brake structure when fluid pressure in the cylinder 62 is relieved, tension springs 82 are connected between radially inwardly extending fingers 84 and 86 on the discs 34 and 36. These springs resiliently draw the discs against the cam elements 40 so that the discs tend to return to the deenergized position when the fluid pressure is relieved. This action draws the cylinder 62 downwardly to the deenergized position shown in FIGS 3 and 4. Preferably a resilient stop element 88 formed from a suitable rubber or rubber-like material is provided in the upper end of the cylinder 62 for limiting relative movement of the piston into the cylinder. In addition a compression spring 90 is provided between the upper end of the cylinder and the piston and another compression spring 92 is provided between the piston and the lower end or base portion of the piston rod so that the piston and piston rod are normally resiliently urged downwardly toward the peripheries of the actuating discs with a sufficient force to prevent the parts from vibrating and rattling when the brake is deenergized. An outer end of the cylinder 62 is formed with an apertured eye element 94 adapted to be pivotally connected with a link 96 by a pin 98. The link 96 is connectable with any suitable mechanical linkage which may be used in the event of a failure in the fluid pressure system for pulling the cylinder 62 outwardly and thereby energizing the brake. Alternatively the mechanical actuating means may be used for energizing the brake whenever the power system of the machine in which the brake structure is installed is not in operation, for example in the case of a tractor, when the tractor is to be parked.

FIG. 6 shows a modified form of the present invention. This embodiment is similar to the structure described above as indicated by the application of identical reference numerals with the suffix *a* added and it is to be understood that this embodiment includes housing means, friction discs, and actuating discs essentially identical to the corresponding elements of the embodiment shown in FIGS. 1 through 5. This embodiment differs in that the ears 50*a* and 52*a* on the actuating discs are formed to provide generally opposed and radially converging cam surfaces 100 and 102 and the cylinder 62*a* is provided with a generally wedged-shaped configuration presenting cam surfaces 104 and 106 in opposing relationship with respect to the surfaces 100 and 102 respectively. If desired rollers or other anti-friction or bearing elements 108 and 110 may be provided between the pairs of cam surfaces 100–104 and 102–106 for facilitating operation of the brake unit so that it will be observed, in this embodiment, the brake is energized when the cylinder is radially extended for urging the ears 50*a* and 52*a* away from each other while in the above-described embodiment the brake is energized when the corresponding ears are drawn toward each other.

While the preferred embodiments of the present invention have been shown and described herein, it is obvious that many structural details may be changed without departing from the spirit and scope of the appended claims.

The invention is claimed as follows:

1. In a brake structure a pair of opposed relatively rotatable and axially shiftable actuating discs having peripheral margins substantially defined by a circle having a first diameter, means between said actuating discs for axially shifting the discs upon relative rotation thereof, said discs respectively including ears projecting laterally of peripheral margins thereof at circumferentially spaced locations and having outer ends intersecting an imaginary circle concentric with and having a diameter greater than said first mentioned circle, and fluid pressure operable means including piston and cylinder members disposed between said ears for actuating said discs, one of said piston and cylinder members bearing against said peripheral margin of one of said discs between said ears and the other of said piston and cylinder members being operatively connected with said ears at a location substantially between said first and second mentioned circles so that upon operation of the fluid pressure means said other of said piston and cylinder members is shifted laterally outwardly with respect to said discs for shifting said ears relative to each other and thereby relatively rotating said discs.

2. A brake structure, as defined in claim 1, which includes links respectively pivotally connected to said ears and to said other of said piston and cylinder members for relatively rotating said discs in response to movement of said other of said piston and cylinder members.

3. A brake structure, as defined in claim 1, wherein said ears present generally oppositely facing cam surfaces, and said other said piston and cylinder members include cam means disposed between and cooperable with said surfaces for relatively rotating the discs in response to movement of said other of said piston and cylinder means.

4. A brake structure, as defined in claim 1, which includes mechanical means connected with said other of said piston and cylinder members and selectively operable for energizing the brake structure.

5. In a brake structure of the type described a pair of opposed relatively rotatable and axially shiftable actuating discs having peripheral margins substantially defined by a circle having a first predetermined diameter, means between said actuating discs for relatively axially shifting the discs upon relative rotation thereof, said discs respectively including ears projecting laterally of said peripheral margins and having outer ends intersecting an imaginary circle concentric with and having a diameter greater than said first mentioned circle, fluid pressure operable means including piston and cylinder members for relatively rotating said discs, said cylinder member being disposed adjacent and extending generally radially outwardly of peripheral marginal portions of said discs and between said ears, said piston member including a portion slidably disposed in said cylinder member and a rod portion extending axially from the cylinder member for abutment against said peripheral marginal portion of one of said discs whereby upon operation of the fluid pressure means said cylinder member will be shifted generally radially with respect to said discs, and means interconnecting said cylinder member with said ears at a location substantially between said circles for relatively rotating the discs in response to movement of the cylinder member.

6. A brake structure, as defined in claim 5, wherein said piston rod portion pivotally abuts said first mentioned portion of the piston member for accommodating relative movement of the actuating discs.

7. A brake structure, as defined in claim 5, wherein said fluid pressure means comprises resilient means between said cylinder member and the piston member for continuously urging the piston member toward said discs.

8. A brake structure, as defined in claim 5, which includes a bearing element disposed between said rod portion and said peripheral marginal portion.

9. A brake structure, as defined in claim 5, wherein said piston rod portion is separate from said first mentioned portion of the piston member, said structure including a spring between said rod portion and said first mentioned piston member portion for continuously biasing said rod portion for engagement with said disc marginal portion.

10. A brake structure, as defined in claim 5, which includes links pivotally connected between said ears and said cylinder member for rotating said actuating discs in response to movement of said cylinder member.

11. A brake structure, as defined in claim 5, which includes opposing cooperable cam means on said ears and said cylinder member for rotating said actuating discs in response to movement of said cylinder member.

References Cited by the Examiner

UNITED STATES PATENTS

| | | | |
|---|---|---|---|
| 1,571,246 | 2/1926 | Down | 188—152 |
| 1,648,864 | 11/1927 | Pugh | 188—152 X |
| 2,874,807 | 2/1959 | Hahn | 188—72 |
| 2,883,007 | 4/1959 | Klaue | 188—72 |
| 2,900,051 | 8/1959 | Hillegass | 188—72 |
| 3,035,666 | 5/1962 | Beeskow | 188—217 |
| 3,088,553 | 5/1963 | Kershner et al. | 188—72 |

FOREIGN PATENTS

| | | |
|---|---|---|
| 734,271 | 7/1955 | Great Britain. |
| 825,964 | 12/1959 | Great Britain. |

MILTON BUCHLER, *Primary Examiner.*

EUGENE G. BOTZ, *Examiner.*

G. E. A. HALVOSA, *Assistant Examiner.*